United States Patent
Hillard

(10) Patent No.: US 9,997,051 B2
(45) Date of Patent: Jun. 12, 2018

(54) DUAL MODE ITEM LOCATING SYSTEM

(71) Applicant: Angelia Hillard, East Chicago, IN (US)

(72) Inventor: Angelia Hillard, East Chicago, IN (US)

( * ) Notice: Subject to any disclaimer, the term of this patent is extended or adjusted under 35 U.S.C. 154(b) by 0 days. days.

(21) Appl. No.: 15/181,049

(22) Filed: Jun. 13, 2016

(65) Prior Publication Data

US 2017/0024994 A1      Jan. 26, 2017

Related U.S. Application Data

(60) Provisional application No. 62/194,249, filed on Jul. 19, 2015.

(51) Int. Cl.
| | |
|---|---|
| *G08B 21/24* | (2006.01) |
| *H04W 4/02* | (2018.01) |
| *G08B 25/01* | (2006.01) |
| *G01S 19/17* | (2010.01) |

(52) U.S. Cl.
CPC ........... *G08B 21/24* (2013.01); *G08B 25/016* (2013.01); *H04W 4/02* (2013.01); *G01S 19/17* (2013.01)

(58) Field of Classification Search
CPC ....... G08B 21/24; G08B 25/016; H04W 4/02; H04W 4/008; G01S 19/17
See application file for complete search history.

(56) References Cited

U.S. PATENT DOCUMENTS

| | | | |
|---|---|---|---|
| 5,512,902 A | 4/1996 | Guthrie et al. | |
| 6,664,896 B2 | 12/2003 | McDonald et al. | |
| 7,453,357 B2 | 11/2008 | Bernal-Silva et al. | |
| 7,522,925 B2 * | 4/2009 | Waters | G06F 17/3087 |
| | | | 455/414.1 |
| 8,254,958 B2 | 8/2012 | Johnson | |
| 8,526,884 B1 * | 9/2013 | Price | H04W 8/005 |
| | | | 455/41.2 |
| 8,594,737 B2 | 11/2013 | Walker et al. | |
| 8,618,928 B2 * | 12/2013 | Weed | B64D 45/00 |
| | | | 340/539.1 |
| 9,294,876 B2 * | 3/2016 | Haro | H04W 4/023 |
| 2005/0186968 A1 | 8/2005 | Durst et al. | |
| 2007/0184852 A1 * | 8/2007 | Johnson | H04W 64/00 |
| | | | 455/456.1 |
| 2009/0224909 A1 * | 9/2009 | Derrick | G01S 5/0027 |
| | | | 340/539.13 |
| 2011/0205124 A1 | 8/2011 | Shelef | |
| 2012/0214545 A1 | 8/2012 | Johnson | |

(Continued)

*Primary Examiner* — Mohamed Barakat
(74) *Attorney, Agent, or Firm* — The Iwashko Law Firm, PLLC

(57) ABSTRACT

A dual mode locating system for determining the location of predetermined items. The dual mode locating system includes a wall mounted locating housing, at least one locating beacons that is attachable to items to be monitored, and a positioning system interface, each of which are connected to a wireless network so as to allow them to communicate data electronically. The locating housing is operative to selectively generate a sensory alert on the locator beacon to provide for close proximity locating functionality. The positioning system interface is operative to retrieve real time positioning information from both the locating beacon and the locating housing and display the relative position of the locator beacon to the locating housing. As such, the positioning system interface provides for more remote proximity locating functionality.

10 Claims, 2 Drawing Sheets

(56) References Cited

U.S. PATENT DOCUMENTS

| | | | |
|---|---|---|---|
| 2012/0258741 A1* | 10/2012 | Tillson | G01S 3/046 455/457 |
| 2015/0235477 A1* | 8/2015 | Simkin | G07B 15/02 705/417 |
| 2015/0247913 A1* | 9/2015 | Messier | G01S 19/48 340/539.13 |
| 2016/0277879 A1* | 9/2016 | Daoura | H04W 4/008 |

* cited by examiner

DUAL MODE ITEM LOCATING SYSTEM

CROSS REFERENCE TO RELATED APPLICATIONS

This application claims the benefit of and incorporates by reference U.S. provisional patent application Ser. No. 62/194,249 filed Jul. 19, 2015.

BACKGROUND OF THE INVENTION

Field of the Invention

This invention relates generally to object position and proximity determining systems and, more particularly, to a locating system which employs an audible alert locating module and a positioning system locating module.

Description of the Prior Art

Individuals commonly possess numerous personal items that are used at various times in their daily life. A problem which still exists, however, is that for some individuals, such personally items are routinely misplaced or lost. While systems exist that would assist a user in finding their misplaced items, such systems generally employ a single sensory locating technology which, depending on what has been misplaced and where it has been misplaced, is not always helpful. Thus, there remains a need for a dual mode locating system which can help a user identify the location of a predetermined item. It would be helpful if such a dual mode locating system was embodied in a fixed locating housing and a plurality of locating beacons attachable to tracked items. It would be additionally desirable for such a dual mode locating system to utilize both an audile alert and positioning system locating modules to improve the ability of a user to pinpoint the location of a desired object.

The Applicant's invention described herein provides for a dual mode locating system adapted to allow a user to generate a locating audible alert related to and a visual display of the relative location of a preselected item. The primary components in Applicant's dual mode locating system are locating housing, a plurality of locating beacons each attachable to a selected item, and a positioning system interface. When in operation, the dual mode locating system enables more effective relative positioning determination through the simultaneous use of independent systems. As a result, many of the limitations imposed by prior art structures are removed.

SUMMARY OF THE INVENTION

A dual mode locating system for determining the location of predetermined items. The dual mode locating system comprises a wall mounted locating housing, at least one locating beacons that is attachable to items to be monitored, and a positioning system interface, each of which are connected to a wireless network so as to allow them to communicate data electronically. The locating housing is operative to selectively generate a sensory alert on the locator beacon to provide for close proximity locating functionality. The positioning system interface is operative to retrieve real time positioning information from both the locating beacon and the locating housing and display the relative position of the locator beacon to the locating housing. As such, the positioning system interface provides for more remote proximity locating functionality.

It is an object of this invention to provide a dual mode locating system which can help a user identify the location of a predetermined item.

It is another object of this invention to provide a dual mode locating system embodied in a fixed locating housing and a plurality of locating beacons attachable to tracked items.

It is yet another object of this invention to provide a dual mode locating system which utilizes both an audile alert and positioning system locating modules to improve the ability of a user to pinpoint the location of a desired object.

These and other objects will be apparent to one of skill in the art.

DETAILED DESCRIPTION OF THE INVENTION

Figure 1:
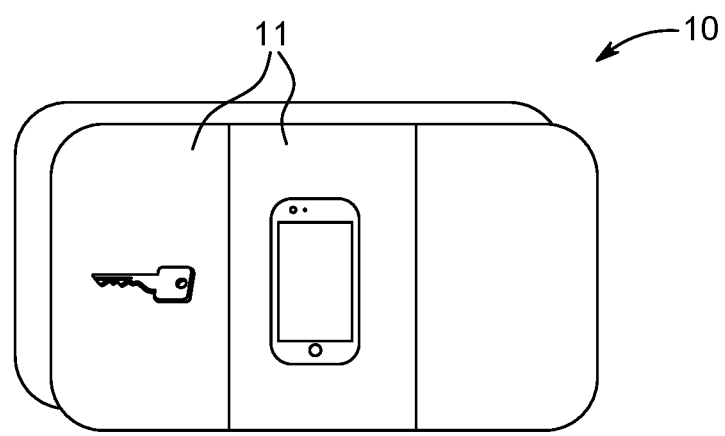
FIG. 1 is a front perspective view of a locating housing of a dual mode locating system built in accordance with the present invention.
Figure 2:
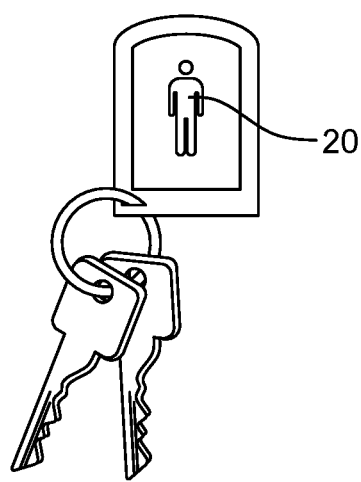
FIG. 2 is a front elevational view of a keychain locating beacon of a dual mode locating system built in accordance with the present invention.
Figure 3:
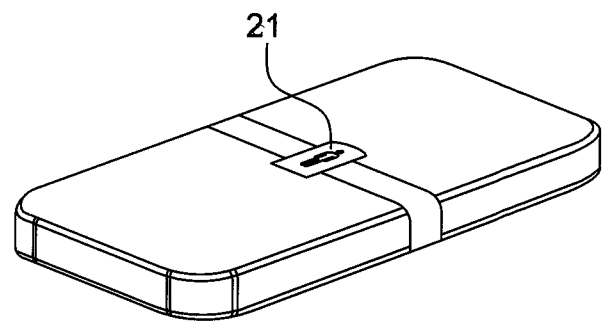
FIG. 3 is a side perspective view of a mobile device locating beacon of a dual mode locating system built in accordance with the present invention.
Figure 4:
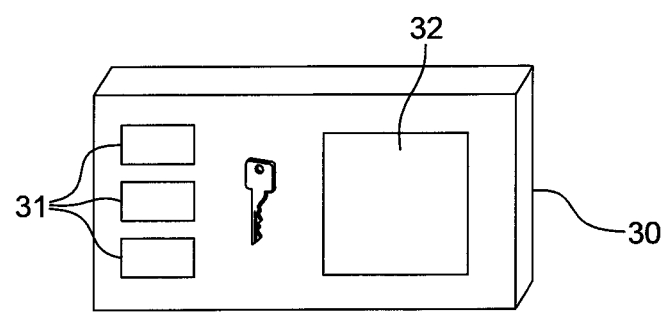
FIG. 4 is a front perspective view of a positioning system interface of a dual mode locating system built in accordance with the present invention.

Referring now to the drawings and in particular FIGS. 1, 2, 3, and 4, a dual mode locating system is shown having a locating housing 10, two types of locating beacons 20, 21, and a positioning system interface 30. The locating housing 10 defines a base unit that, in the preferred embodiment, is wall mounted in a fixed location and connected to a conventional power source. The locating housing 10 includes a networking interface, a communications interface, and a positioning module. The locating housing 10 includes manual interfaces 11 which are each individually associated with a particular locating beacon 20, 21 and which can be actuated by a user to cause the locating housing 10 to generate and transmit an alert signal to its associated locating beacon 20, 21. In one embodiment, the communications interface defines a RF transceiver and the networking interface defines a wireless networking antenna suitable connect to a wireless local area network. In some embodiments, the locating housing 10 includes a touch screen interface.

A keychain locating beacon 20 and a mobile device locating beacon 21 (collectively, locating beacons 20, 21) each define an electronic beacon that includes a networking interface, a communications interface, an onboard power source, and a positioning module. In one embodiment, the communications interface defines a RF transceiver and the networking interface defines a wireless networking antenna suitable connect to a wireless local area network. Each locating beacon 20, 21 additionally includes an internal speaker that can selectively emit an audible alert sound.

In one embodiment, the positioning module in both the locating housing 10 and the locating beacons 20, 21 defines a GPS module operative to receive positioning information from conventional GPS satellites.

The locating housing 10 is configured to selectably communicate electronic data wirelessly with said locating beacons 20, 21 such that when an alert signal related to a selected locating beacon 20, 21 has been generated, the alert signal is transmitted to the selected locating beacon 20, 21 through either their respective networking or communications interfaces. It is contemplated that the communication interface enables the communication of signals directly of a predetermined frequency, while the networking interface enables the communication of signals through a shared gateway or over another computer network.

When either of the locating beacons 20, 21 receive an alert signal from the locating housing 10, the respective locating beacon 20, 21 generate its audible alert sound. It is appreciated that this alert sound provides an audible mechanism for determining the location of the locating beacon 20, 21 and, by extension, any personal device attached to the locating beacon 20, 21.

The positioning system interface 30 defines a portable unit that includes an onboard power source, a networking interface, and a plurality of manual actuators 31 that are each individually associated with one of the locating beacons 20, 21. The positioning system interface 30 is configured to communicate data electronically with the locating housing 10 and the locating beacons 20, 21 through the respective networking interfaces. Through this network connection, when one of the manual actuators 31 is actuated, the positioning system interface 30 retrieves real time positioning information from both the locating beacon 20, 21 associated with the actuated actuator 31 and the locating housing 10, calculates the relative position of the associated locating beacon 20 relative to the locating housing 10, and displays on a display screen 32 a graphical representation of the calculated relative position. In some embodiments, the positioning system interface 30 includes a touch screen interface.

In another embodiment, such positioning modules define conventional indoor wireless network positioning modules or RFID based positioning modules.

In one embodiment, the keychain locating beacon 20 defines a modified keychain and the mobile device locating beacon 21 defines an adjustable clip sized to slide on and remain in place over a conventional mobile device.

It is contemplated that in alternate embodiments, the dual mode locating system may be used in association with additional handheld items beyond conventional household items.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A dual mode locating system for determining the location of predetermined items, comprising:
    a locating housing defining a fixed base unit having a power source, housing networking interface, a housing communications interface, and a housing positioning module operative to receive geolocation data from a satellite positioning system;
    at least one locating beacon defining an electronic beacon that includes a sensory alert interface, a beacon networking interface, a beacon communications interface, an onboard power source, and a beacon positioning module operative to receive geolocation data from a satellite positioning system;
    wherein said location housing and said at least one locating beacon are adapted to communicate electronic signals through at least one of the housing networking interface and beacon networking interface interaction and the housing communications interface and the beacon communications interface interaction;
    wherein said locating housing additionally includes a manual interface actuator associated with said at least one locating beacon and upon the actuation of the manual interface actuator, said locating housing is adapted to transmit an alert signal to the at least one locating beacon associated therewith, thereby causing said sensory alert interface to activate;
    a positioning system interface defining a portable unit that includes an onboard power source, a system networking interface, and a display screen;
    wherein said positioning system interface is adapted to communicate electronic signals with said location housing and said at least one locating beacon through the interaction between the system networking interface, housing communications interface and the beacon communications interface;
    wherein said positioning system interface additionally includes a manual positioning actuator associated with said at least one locating beacon and upon the actuation of the manual positioning actuator, said positioning system interface is adapted to retrieve geolocation data from the at least one locating beacon associated with the manual positioning actuator and the locating housing and display the position of the at least one locating beacon relative to the locating housing.

2. The dual mode locating system of claim 1, wherein said housing positioning module and beacon positioning module each define satellite positioning modules.

3. The dual mode locating system of claim 1, wherein said housing networking interface, beacon networking interface and system networking interface each define a wireless personal area network interfaces.

4. The dual mode locating system of claim 1, wherein said housing networking interface, beacon networking interface and system networking interface each define a wireless local area network interfaces.

5. The dual mode locating system of claim 1, wherein said housing communications interface and beacon communications interface each define a RF transceiver.

6. A dual mode locating system for determining the location of predetermined items, comprising:
    a locating housing defining a fixed base unit having a power source, housing networking interface, a housing communications interface, and a housing positioning module operative to receive geolocation data from a satellite positioning system;
    at least one locating beacon defining an electronic beacon that includes a sensory alert interface, a beacon networking interface, a beacon communications interface, an onboard power source, and a beacon positioning module operative to receive geolocation data from a satellite positioning system;
    wherein said location housing and said at least one locating beacon are adapted to communicate electronic signals through the interaction between the housing communications interface and the beacon communications interface;
    wherein said locating housing additionally includes a manual interface actuator associated with said at least one locating beacon and upon the actuation of the manual interface actuator, said locating housing is adapted to transmit an alert signal to the at least one locating beacon associated therewith, thereby causing said sensory alert interface to activate;
    a positioning system interface defining a portable unit that includes an onboard power source, a system networking interface, and a display screen;

wherein said positioning system interface is adapted to communicate electronic signals with said location housing and said at least one locating beacon through the interaction between the system networking interface, housing communications interface and the beacon communications interface;

wherein said positioning system interface additionally includes a manual positioning actuator associated with said at least one locating beacon and upon the actuation of the manual positioning actuator, said positioning system interface is adapted to retrieve geolocation data from the at least one locating beacon associated with the manual positioning actuator and the locating housing and display the position of the at least one locating beacon relative to the locating housing.

7. The dual mode locating system of claim 6, wherein said housing positioning module and beacon positioning module each define satellite positioning modules.

8. The dual mode locating system of claim 6, wherein said housing networking interface, beacon networking interface and system networking interface each define a wireless personal area network interfaces.

9. The dual mode locating system of claim 6, wherein said housing networking interface, beacon networking interface and system networking interface each define a wireless local area network interfaces.

10. The dual mode locating system of claim 6, wherein said housing communications interface and beacon communications interface each define a RF transceiver.

* * * * *